UNITED STATES PATENT OFFICE.

ADOLPH BROUGIER, OF MUNICH, GERMANY.

ART OF ROASTING COFFEE.

SPECIFICATION forming part of Letters Patent No. 617,434, dated January 10, 1899.

Application filed February 12, 1897. Serial No. 623,187. (No specimens.)

*To all whom it may concern:*

Be it known that I, ADOLPH BROUGIER, a citizen of the Empire of Germany, residing at Munich, in the Kingdom of Bavaria and Empire of Germany, have invented certain new and useful Improvements in the Art of Roasting Coffee, (for which I have obtained patents in Hungary, dated March 4, 1896; in Great Britain, dated April 24, 1893, No. 8,270; in France, dated February 24, 1894, No. 229,579, and in Tunis, dated August 5, 1895, No. 159;) and I do hereby declare the following to be a full, clear, and exact description of the invention, such as will enable others skilled in the art to which it appertains to make and use the same.

The present invention relates to the art of roasting coffee; and its object is to roast the coffee in such a manner that a great deal of its aromatic and other valuable volatile ingredients lost heretofore by evaporation during the roasting process and by roasting the beans to excess is preserved to them.

In the roasting processes hitherto employed a large proportion of valuable aromatic substances and also of some of the solid ingredients soluble in water were lost or destroyed by the excessive roasting of the outer layers of the coffee-bean. In these known processes the roasting was either performed in such a way that the material to be roasted was aired during the roasting process or the beans were cooled off only after they had been completely roasted. All these methods result in an unequally-roasted product, for since the roasting proceeds from the surface of the beans toward the interior and the outer strata of the beans are naturally roasted completely before the inner portions, and since the heat cannot thereafter continue to act upon these inner portions to completely roast these also without first passing through the completely-roasted outer layers, it is manifest that the outer layers of the beans must be roasted to excess. These outer layers are thus rendered porous and loose in texture, which results, consequently, in the loss of a large proportion of the valuable and desirable extractive and aromatic substances. This loss cannot be repaired by the cooling of the coffee-beans after the roasting is completed, as usual in the roasting processes hitherto made known, the valuable substances having already escaped beyond recovery before cooling. Nor is it possible to prevent this waste of aromatic principles and extractive matter and the resulting deterioration which has taken place during the roasting operation by subsequently pouring a saccharine solution over the beans, and thus coating the same. Again, those processes in which fresh air is introduced into the roasting-drum during the roasting operation by means of blowers or otherwise result only in retarding the roasting process or in removing the skins and foreign particles which are separated from the beans in the course of the process. None of these processes has the effect of checking the waste of valuable ingredients hereinabove set forth. Now it is the primary object of my invention to put a stop to this waste and destruction, as already stated above.

Another object is to impart to the roasted product a perfectly homogeneous and uniform texture, which results in greater keeping qualities of the roasted product without providing the same with an outer coating of a foreign substance.

These objects I accomplish by my invention, which, broadly considered, consists in suddenly and intensely chilling the beans during and before the completion of the roasting process. By such sudden chilling and the consequent withdrawal of the heat from the surfaces of the beans the roasting process is completely interrupted so far as the outer layers of the beans are concerned, a roasting of the same to excess is avoided, and the consequent volatilization of the aromatic substances generated within the same is checked as far as practicable.

I will now describe in detail what I consider the best manner of carrying out my process.

The coffee-beans are first partially roasted in the well-known manner. This preliminary roasting is carried out only until the outer layers of the beans are completely roasted, the inner portions or core of the beans, however, being only partially roasted and requiring the further application of heat to be roasted through. This occurs when the material to be roasted has attained a temperature of about 200° centigrade, varying some-what, according to the nature of such material. When the material to be roasted has acquired this temperature, the roasting of the outer layers of the beans is suddenly interrupted or checked. This is best done by adding to the beans in the roasting-drum or other receptacle a cooling liquid, such as cold water, liquefied carbonic acid, or the like. By this addition the temperature of the interior of the roasting-receptacle and of the surfaces of the beams is suddenly reduced for about from 30° to 40° Celsius. This cooling and the attendant pressure taking place cause a contraction in the fiber of the epidermis or outer layers of coffee-beans, such compacted texture effectively confining the aromatic substances formed and forming during the roasting process and the products of the decomposition of the cellular matter and preventing their dissipation. This operation must take place at substantially the temperature indicated, for if the roasting process of the outer layers of the beans were interrupted at an earlier stage the aromatic and empyreumatic substances generated during the roasting process would not be sufficiently evolved. If, on the other hand, it were pushed beyond the time thus indicated the chilling step would come in too late, since the aromatic substances would then be in a great measure evaporated and dissipated. Moreover, I have found that in order to obtain the best possible results the quantity of the cooling agent or fluid must be so regulated as to cause a sudden decrease of the temperature for about from 30° to 40° centigrade. An excessive diminution of the temperature would decrease the heat stored up in the beans to such an extent that the roasting process going on in the interior of the beans would also be disturbed. An insufficient reduction in the temperature, on the other hand, would result in an insufficient checking of the roasting process taking place in the outer epidermidal layers of the beans, and hence the main object of the chilling process would be defeated. By this process, therefore, the outer layers of the bean and the air in the interior of the roasting-receptacle are exposed to an exceedingly rapid and intense chilling after having reached the required temperature at which the outer layers are sufficiently roasted. This chilling effect is, however, carried only so far that the roasting process taking place in the interior or heart of the beans is not disturbed, but continues without interruption. Under these conditions the interior or heart of the bean is still subjected to the high temperature necessary for roasting the same, and it is thus roasted to a finish by its own heat. This is particularly the case where care is taken that no other decrease of temperature except that due to the sudden intense chilling of the surface layers of the beans takes place, the heating apparatus being allowed to act until the beans have been roasted completely through. Should it then be found by testing the product that after the described sudden chilling of their surface layers the beans are still insufficiently roasted in their interior the roasting is continued and the above process is repeated—*i. e.*, the beans, after having attained the above-indicated temperature, are again exposed to a sudden intense chilling or reduction of the temperature by adding a cooling fluid and then allowing the beans to be roasted internally by their own heat until the coffee has attained the proper color and is completely roasted through. When this has been attained, the finished roasted product is cooled off in the well-known manner hitherto employed.

The cooling agent or fluid to be employed in the new process must manifestly be such a fluid or liquid as will not affect the taste of the coffee or act injuriously from a hygienic point of view.

Beans roasted according to my invention contain a substantially higher proportion of of extractive matter and aromatic substances. This gain in extractive and aromatic principles amounts to upward of two per cent. for good grades of coffee, so that while under the best conditions hitherto attainable a yield of from twenty-one to twenty-four per cent. in such aromatic and extractive matters was obtained, according to the quality of the beans, the same grades of coffee yielded from twenty-three to twenty-six per cent. of these matters—that is to say, my new process results in a gain of from one-twelfth to one-tenth, or eight per cent., in such substances over the old methods when applied under equal conditions.

A further advantage flowing from my invention is that the caffeol will be preserved to a greater extent than was possible under the old methods. A substantially more desirable product is hence attained.

Another and very prominent advantage is that under this invention roasted coffee-beans are obtained whose outer epidermidal layers are compacted, showing less porosity than where the beans are roasted according to the old methods. The sudden energetic lowering of the temperature of these outer layers brings about a contraction and closing up of the cell membrane and intercellular spaces, whereby the layers of cellular tissue on the surface of the beans are caused to form an impenetrable envelop or armor. It also results in a compression throughout, as hereinabove set forth, whereby the envelop or covering layers of the beans attain a homogeneous texture, as contradistinguished from beans roasted in the usual way, a section through which shows said layers to be loosely arranged and porous. The impenetrable and hardened envelop thus imparted to the beans enables them to keep for months without losing their desirable volatile products to any appreciable extent, and thus they remain preserved well for a long period of time, which is of great importance to the trader and consumer. The only way in which this advantage was in a measure attainable heretofore was by coating the individual beans with a saccharine crust or other coating which made it impossible to properly judge the quality of the roasted product. Moreover, it is clear that the addition of this foreign matter to the coffee was not desirable for various reasons.

Finally it is to be noted that my invention results in a perfect uniform roasting, while in the processes hitherto employed it is difficult to prevent the formation of blemishes and spots on the surface of the beans where they have been over or under roasted.

Having thus set forth my invention and the best manner of carrying the same into effect, what I claim, and desire to secure by Letters Patent, is—

1. In the art of roasting coffee the process which consists in heating the beans until the roasting of the outer layers of the beans is completed, then suddenly chilling the beans, and finally continuing the roasting until the beans are roasted through.

2. In the art of roasting coffee, the process which consists in heating the beans until they have attained a temperature of substantially 200°, centigrade, then suddenly reducing the temperature of the outer layers for about 30° to 40°, centigrade, then continuing the heating operation until the beans are roasted through.

3. In the art of roasting coffee, the process which consists in heating the beans in a receptacle until they have attained a temperature of substantially 200°, centigrade, then suddenly introducing into said receptacle a cooling fluid, then continuing the heating operation until the beans are roasted through.

4. In the art of roasting coffee, the process which consists in heating the beans in a receptacle until they have attained a temperature of substantially 200°, centigrade, then suddenly introducing a cooling liquid into the receptacle to lower the temperature of the outer layers of the beans, then continuing the heating until the beans are roasted through and finally cooling off the beans in the usual manner.

In testimony whereof I affix my signature in presence of two witnesses.

ADOLPH BROUGIER.

Witnesses:
　CARL MUSCHI,
　FRITZ BÜHLER.